(12) United States Patent
Zwinkels

(10) Patent No.: US 10,077,949 B2
(45) Date of Patent: Sep. 18, 2018

(54) HEAT ACCUMULATOR AND METHOD FOR OPERATING A HEAT ACCUMULATOR

(71) Applicant: Lumenion GmbH, Berlin (DE)

(72) Inventor: Andrew Zwinkels, Berlin (DE)

(73) Assignee: Lumenion GmbH, Berlin (DE)

( * ) Notice: Subject to any disclaimer, the term of this patent is extended or adjusted under 35 U.S.C. 154(b) by 379 days.

(21) Appl. No.: 14/871,188

(22) Filed: Sep. 30, 2015

(65) Prior Publication Data
US 2016/0097603 A1 Apr. 7, 2016

(30) Foreign Application Priority Data

Sep. 30, 2014 (EP) .................................... 14187148

(51) Int. Cl.
*F01K 3/00* (2006.01)
*F28D 20/00* (2006.01)
(Continued)

(52) U.S. Cl.
CPC ............ *F28D 20/0056* (2013.01); *F01K 3/00* (2013.01); *F24H 7/0233* (2013.01); *F28D 20/02* (2013.01); *F28D 20/021* (2013.01); *F28D 20/028* (2013.01); *F28D 1/0475* (2013.01); *F28D 2020/0078* (2013.01); *Y02E 60/142* (2013.01); *Y02E 60/145* (2013.01)

(58) Field of Classification Search
CPC ...... F01K 3/00; F24H 7/0233; F28D 20/0056; F28D 20/02; F28D 20/021; F28D 20/028; F28D 1/0475; F28D 2020/0078
See application file for complete search history.

(56) References Cited

U.S. PATENT DOCUMENTS

| 3,107,975 A | * | 10/1963 | Linder | ...................... A61L 2/07 236/46 R |
| 4,696,338 A | * | 9/1987 | Jensen | .................. F28D 20/025 165/10 |

(Continued)

FOREIGN PATENT DOCUMENTS

| CH | 192011 A | 7/1937 |
| CN | 2311729 Y | 3/1999 |

(Continued)

OTHER PUBLICATIONS

European search report issued by the European Patent Office dated Mar. 13, 2015, which corresponds to European Patent Application No. 14187148 and is related to U.S. Appl. No. 14/871,188.

*Primary Examiner* — Phutthiwat Wongwian
*Assistant Examiner* — Matthew T Largi
(74) *Attorney, Agent, or Firm* — Studebaker & Brackett PC

(57) ABSTRACT

A heat accumulator having a housing to receive a heat storage medium, a heat storage medium received in the housing, and a heat exchanger, in which a heat carrier fluid can be transported and which is arranged so that heat can be transferred from the heat storage medium to the heat carrier fluid. The heat accumulator comprises an electrical heating means which is configured to convert electrical energy into heat energy. The electrical heating means is arranged so that it heats the heat storage medium during operation, wherein the heat storage medium heated by the electrical heating means is a metal. In addition a corresponding method is disclosed.

16 Claims, 9 Drawing Sheets

(51) Int. Cl.
  *F24H 7/02*   (2006.01)
  *F28D 20/02*  (2006.01)
  F28D 1/047    (2006.01)

(56)  References Cited

U.S. PATENT DOCUMENTS

| | | | | |
|---|---|---|---|---|
| 5,088,548 | A * | 2/1992 | Lindner | F28D 20/02 |
| | | | | 165/10 |
| 6,701,914 | B2 * | 3/2004 | Schwarz | F28D 20/0052 |
| | | | | 126/400 |
| 2005/0249644 | A1 * | 11/2005 | Schedler | F23G 7/06 |
| | | | | 422/175 |
| 2009/0199998 | A1 * | 8/2009 | Shimozono | F01K 3/00 |
| | | | | 165/104.17 |
| 2013/0333636 | A1 * | 12/2013 | Geradts | F01N 5/025 |
| | | | | 123/2 |
| 2013/0340432 | A1 * | 12/2013 | Hunt | F01K 3/00 |
| | | | | 60/643 |

FOREIGN PATENT DOCUMENTS

| | | | | |
|---|---|---|---|---|
| DE | 10 2012 111 707 A1 | | 6/2014 | |
| DE | 102013004330 A1 * | | 8/2014 | F01K 3/00 |
| WO | 2012/113824 A1 | | 8/2012 | |

* cited by examiner

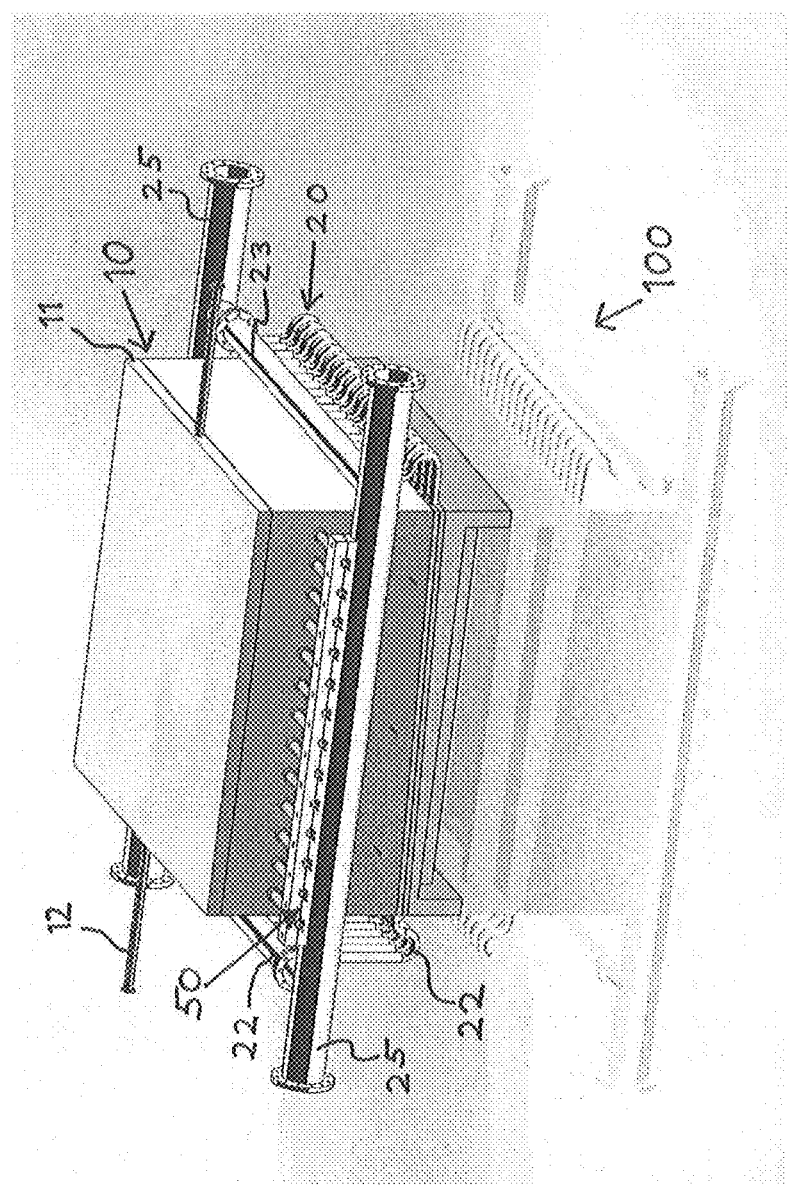

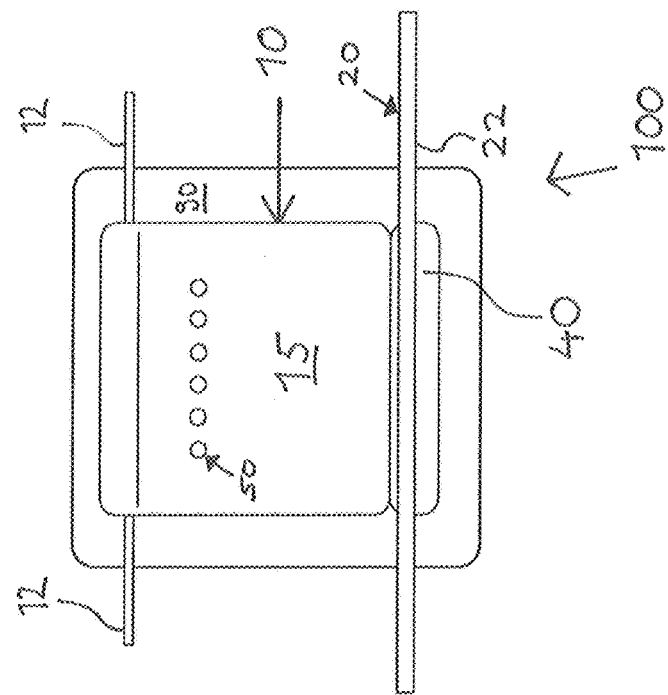
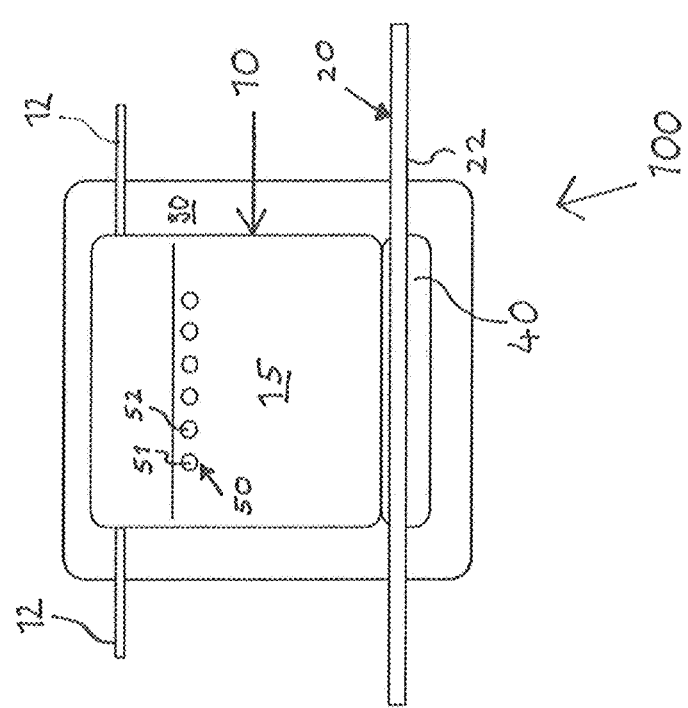

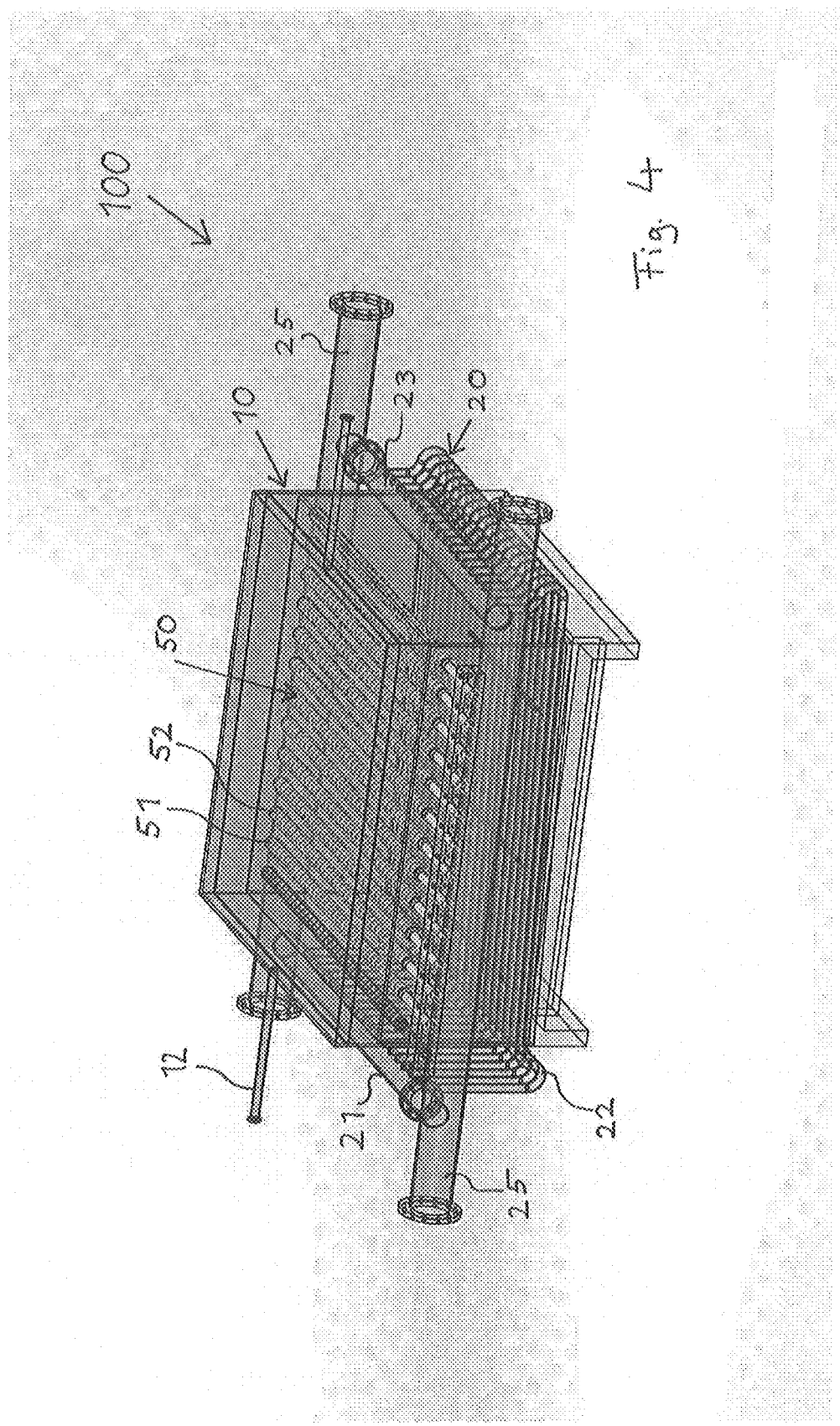

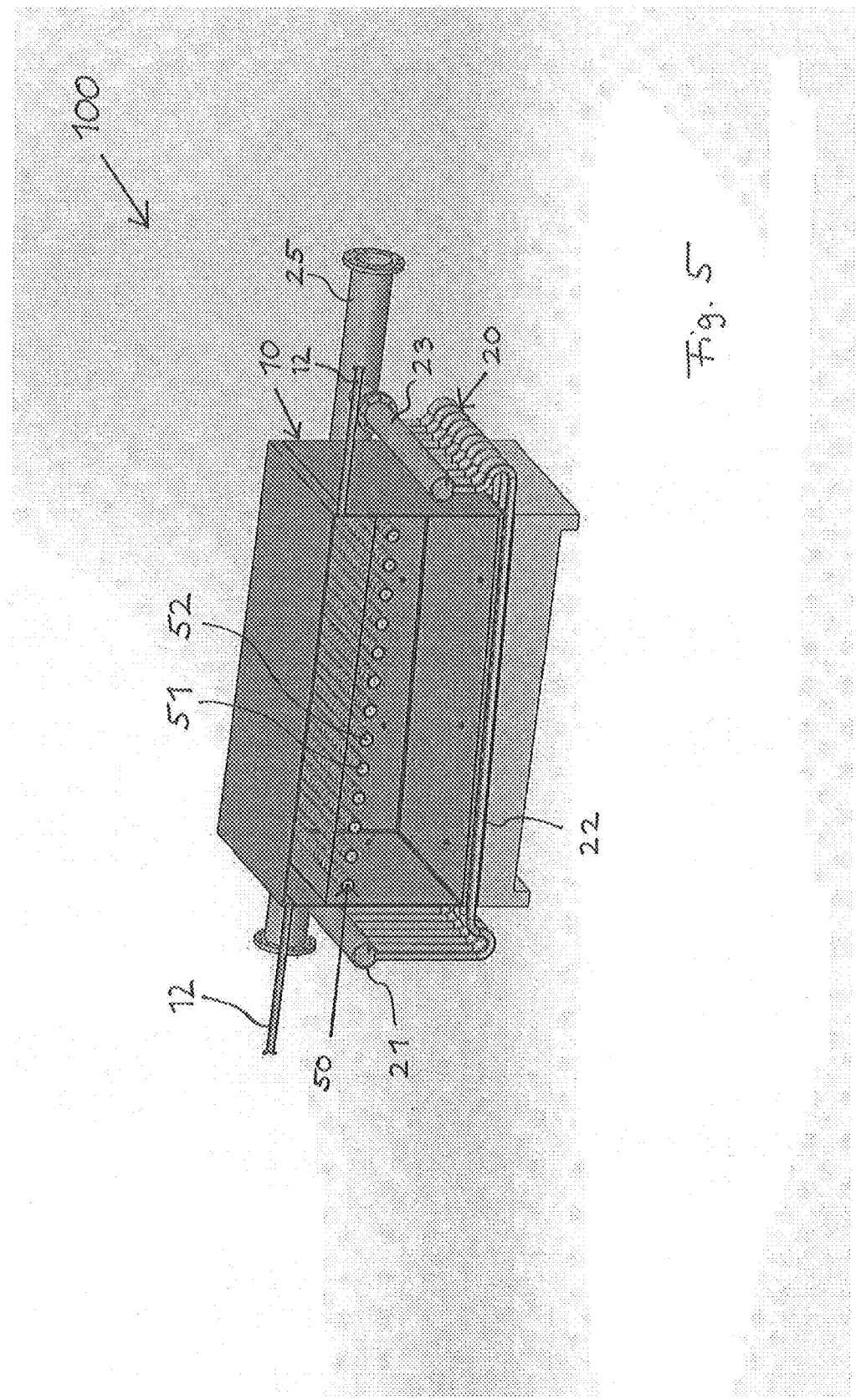

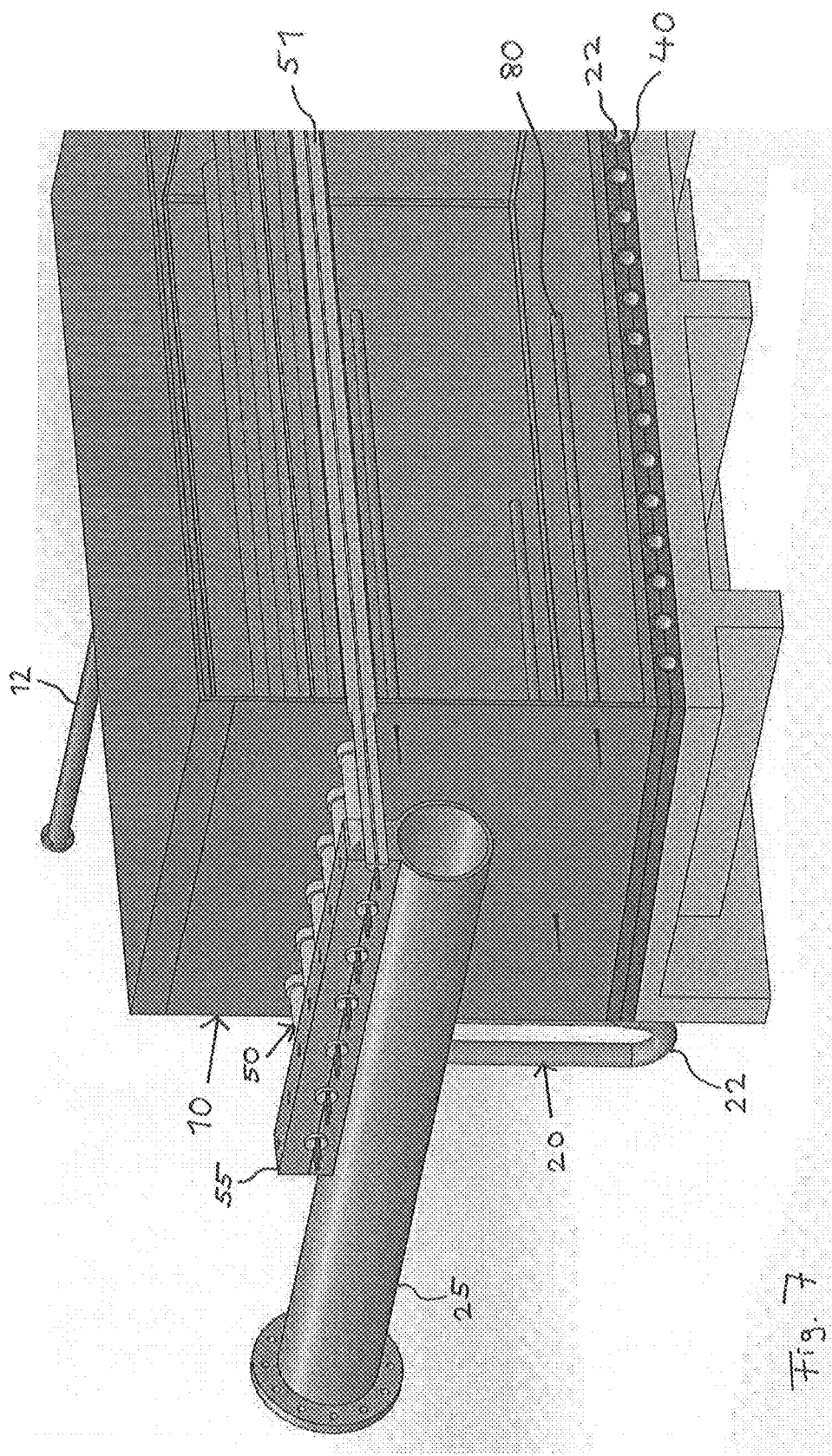

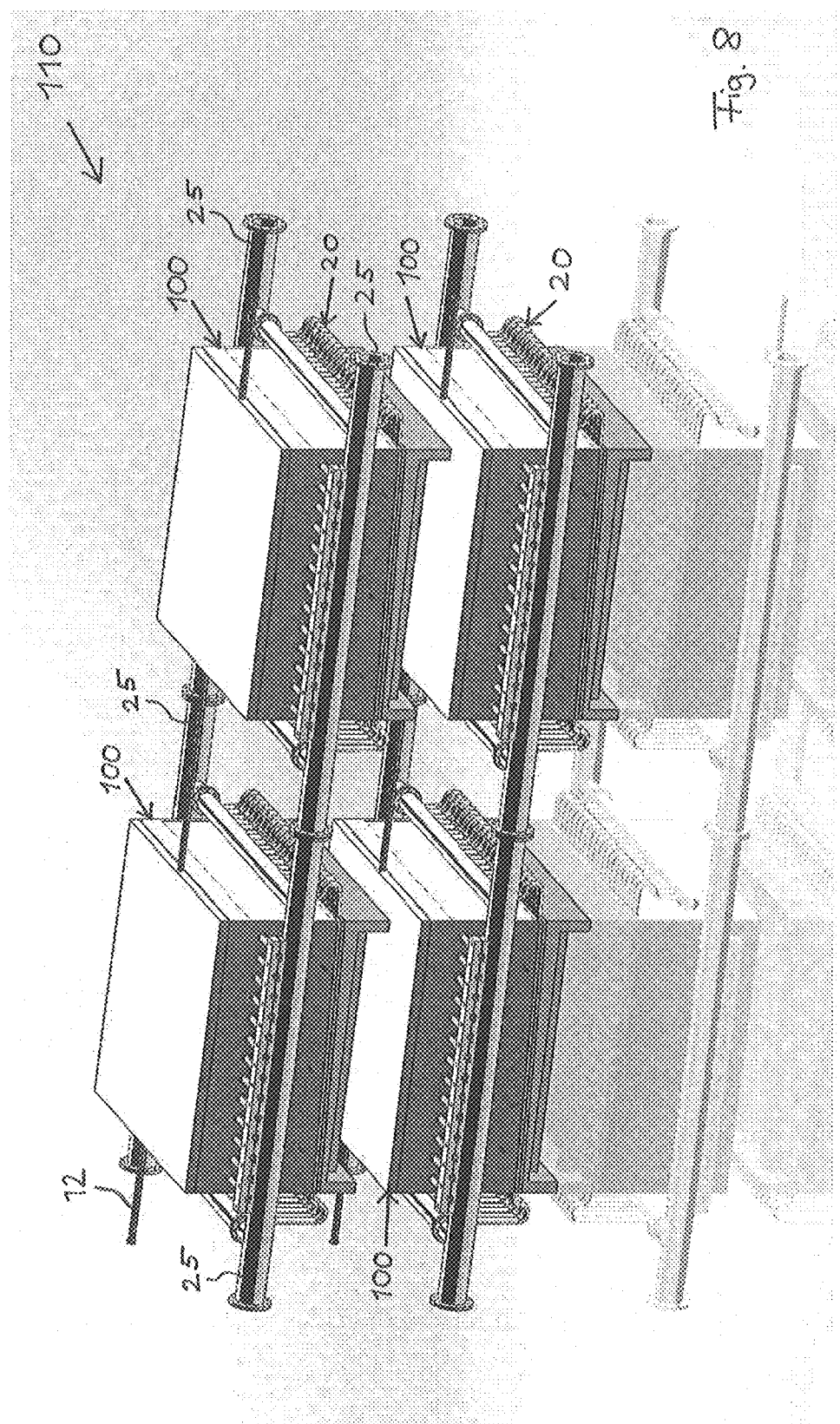

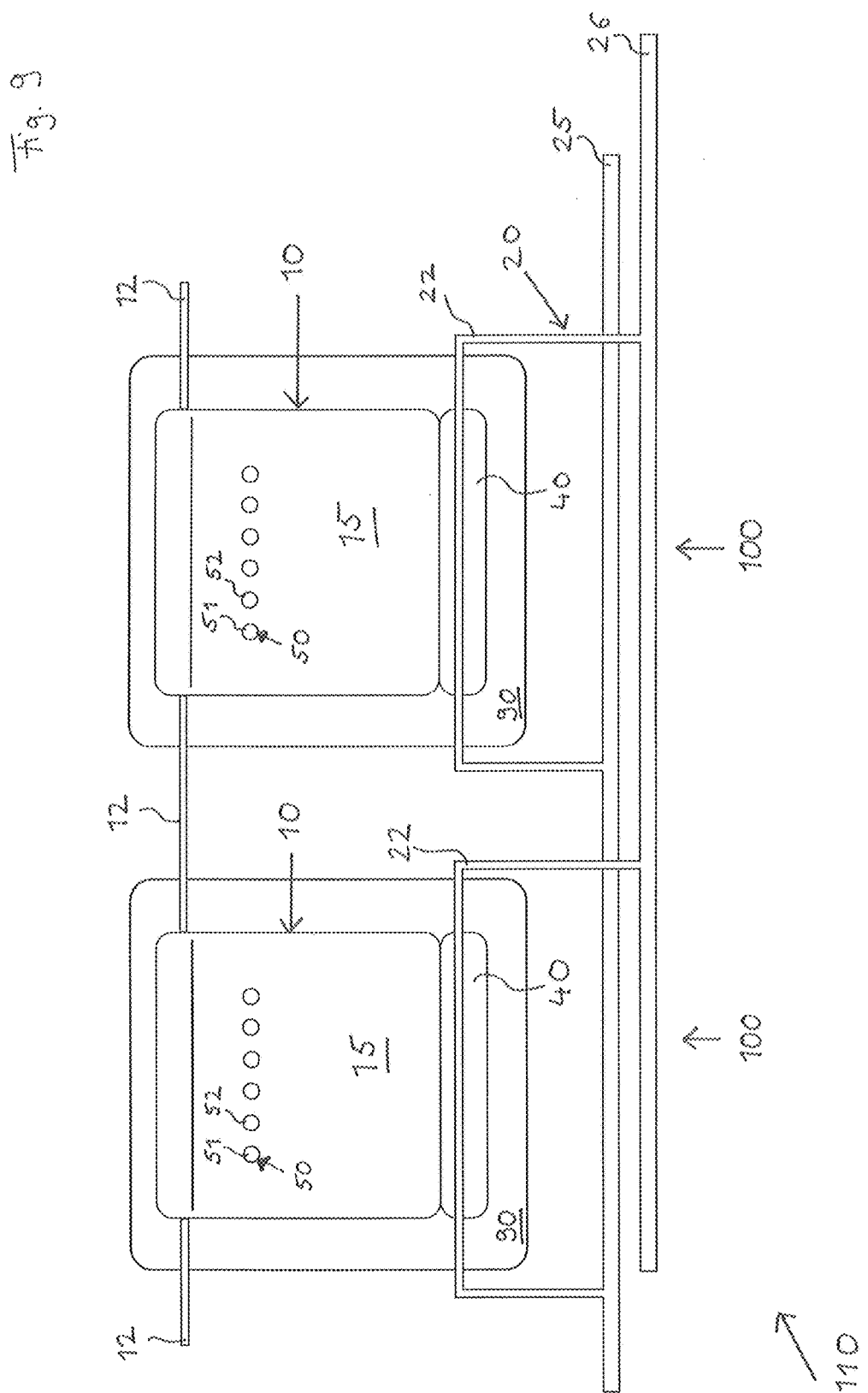

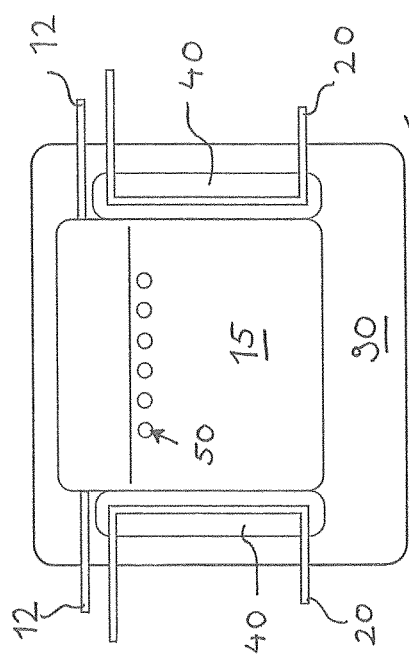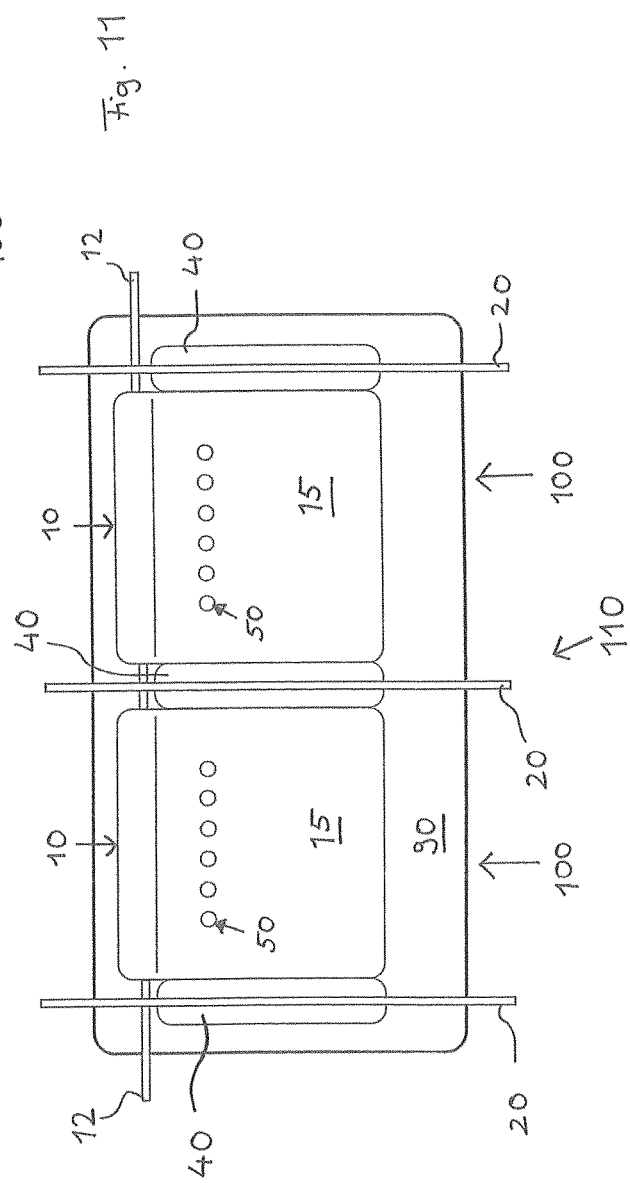

HEAT ACCUMULATOR AND METHOD FOR OPERATING A HEAT ACCUMULATOR

The invention relates in a first aspect to a heat accumulator comprising a housing to receive a heat storage medium, a heat storage medium received in the housing and a heat exchanger, in which a heat carrier fluid can be transported and which is arranged so that heat can be transferred from the heat storage medium to the heat carrier fluid.

The invention relates in a further aspect to a method for operating a heat accumulator, wherein heat energy is transferred from a heat source to a heat storage medium which is received in a housing of the heat accumulator, and wherein heat energy is transferred from the heat accumulator to a heat carrier fluid which is transported through a heat exchanger.

Heat accumulators, which are also referred to as heat storages, comprise a heat storage medium which is heated to store thermal energy. Common heat storage media have a comparatively high specific heat capacity. They can thereby store relatively large amounts of energy without excessively high temperature changes. Heat energy emitted from the heat accumulator is used for numerous different applications.

A generic heat accumulator comprises a housing to receive a heat storage medium and a heat storage medium received in the housing. In addition the heat accumulator comprises a heat exchanger, in which a heat carrier fluid can be transported, and which is arranged so that heat can be transferred from the heat storage medium to the heat carrier fluid.

Correspondingly, in a generic method for operating a heat exchanger the following steps are carried out: heat energy is transferred from a heat source to a heat storage medium which is received in a housing of the heat accumulator, and heat energy is transferred from the heat accumulator to a heat carrier fluid which is transported through a heat exchanger.

It is advantageous for certain applications if the heat storage medium can be heated to comparatively high temperatures. It is described in DE 10 2012 111 707 A1 that heat energy from for example a thermal power station or a central heating system is stored in that numerous capsules filled with aluminium are used as a heat storage medium.

In WO 2012/113824 A1, waste heat from a train is to be used. For this, a heat accumulator with aluminium as a latent heat storage medium is proposed.

Such known heat accumulators are limited to using waste heat or heat energy of a thermal power station. Forms of energy other than heat energy are not to be stored according to the aforementioned documents by the heat accumulator, converted into heat energy.

It can be regarded as an object of the invention to provide a heat accumulator and a method for operating a heat accumulator which open up application possibilities going beyond the mere intake and emission of heat energy.

This object is achieved by the heat accumulator having the features of set forth in the appended claims and by the method having the features of set forth in the appeneded claims.

Advantageous variants of the heat accumulator according to the invention and the method according to the invention are the subject matter of the dependent claims and are furthermore explained in the following description.

With the heat accumulator of the above mentioned type it is provided according to the invention that an electrical heating means is provided which is configured to convert electrical energy into heat energy. The electrical heating means is arranged so that it heats the heat storage medium during operation, wherein the heat storage medium heated by the electrical heating means is a metal.

In the method of the above mentioned type it is provided according to the invention that as a heat source an electrical heating means converts electrical energy into heat energy and that the heat energy generated by the electrical heating means is transferred to a metal as a heat storage medium.

It can be regarded as an essential idea of the invention to convert electrical energy with an electrical heating means as completely as possible into heat energy. This heat energy is then to be transferred as completely as possible to a metal as a heat storage medium.

The storage of larger amounts of electrical energy constitutes a great challenge. For this, storage power stations are known which expend electrical energy to pump water upstream and thus store energy as potential energy. The space requirement is, however, hereby very high. Batteries and similar means are also known, wherein electrical energy is converted and stored in the form of chemical energy. Chemical energy storage can be understood in that with the supply of energy certain molecules are converted into other molecules. In this way, however, only comparatively small amounts of energy can be stored at reasonable costs. In contrast, the electrical heating means according to the invention allows electrical energy to be converted into heat energy and then to be stored. Together with the idea of heating a metal, it is made possible to also store large amounts of energy comparatively cost-effectively. Due to the high temperature, the stored energy can also be efficiently used again for subsequent applications or converted into other energy forms.

The invention utilises the fact that electrical energy can at times be procured at extremely low prices, sometimes even at negative prices. This is due substantially to the increased use of renewable energy sources such as solar and wind energy. If too much electrical energy is generated and fed into a power network, the power price falls rapidly. In order to protect the power lines, however, the electrical energy must be removed. In the case of too few purchasers the electrical energy must thus be offered at negative prices.

It can be provided that the heat accumulator according to the invention is charged in particular (exclusively) at times at which a surplus of electrical energy is present in an external power network. This can be defined via an upper threshold for a power price. Control means can be provided which only switch on power intake by the electrical heating means when a surplus of electrical energy is ascertained. This can be realised in particular automatically, for example by comparing a current power price with a predefinable maximum price.

The stored heat energy can be emitted in a controllable manner via the heat carrier fluid. The heat energy of the heat carrier fluid can in principle be used as desired. In particular, means can also be provided, with which the heat energy can be converted back into electrical energy. These means can be activated for example precisely when a current power price reaches or exceeds a predefinable minimum price.

An electrical heating means can in principle be understood to be any means that converts electrical energy into heat energy. The electrical heating means is preferably designed so that it converts at least 80%, preferably over 95%, of the electrical energy into heat energy. In this case, it is not the waste heat of another process that is used. Instead the electrical heating means serves precisely for the purpose of generating heat from electrical power. This can be realised for example by resistors.

The electrical heating means can be configured to heat the heat storage medium above its melting point. The latent heat energy of a phase transition can be used, whereby larger amounts of energy can be stored. In addition, by operating in proximity to a phase transition temperature, a comparatively constant heat energy emission to the heat carrier fluid can be realised even if the amount of energy stored in the heat accumulator fluctuates more greatly. In this configuration, the electrical heating means must thus be able to reach a sufficiently high temperature. Depending upon the metal used as a heat storage medium, this minimum temperature can be for example between 600° C. and 1100° C.

Aluminium is particularly preferably used as a heat storage medium. This has a melting temperature of 660° C. This is on the one hand high enough to be able to store large amounts of energy and to facilitate high temperatures of the heat carrier fluid, which can mean a higher coefficient of performance for the subsequent use of the heat carrier fluid. On the other hand the melting temperature is, however, not too high and the container can thus be cost-effectively formed. This container must be made from a material which has a higher melting temperature than the heat storage medium. In the case of aluminium as a heat storage medium, therefore, relatively cost-effective metals can form the container, for example steel.

Alternatively, copper is also suited as a heat storage medium, wherein the container walls can likewise be made with comparatively favourable metals.

A heat exchanger is to be understood to be a means having one or more fluid lines (for example pipelines), through which a heat carrier fluid is conveyed, in particular pumped. The fluid line(s) is/are in thermal contact with the heat storage medium, i.e., in particular, no air insulation is present between them. Instead, the heat storage medium and the fluid line(s) are connected by a material with good thermal conductivity, for example by metal. The heat carrier fluid can in principle be any liquid or in principle any gas. It can be preferable that a phase transition temperature of the heat carrier fluid is below that of the heat storage medium. In general more energy can thereby be transferred to the heat carrier fluid.

The housing can be understood to be the walls which surround, in particular enclose, the heat storage medium. The heat storage medium can directly contact inner walls of the housing.

The electrical heating means can be arranged so that it emits heat energy in an upper region within the housing to the heat storage medium. In other words, the electrical heating means can project into an upper region of the housing or be arranged there. The upper region can be understood to be the upper third or upper quarter of the housing. The electrical heating means is preferably arranged spaced apart from the upper edge of the housing.

Consideration is thereby given to the fact that the housing is preferably not completely filled with heat storage medium, in order to ensure that an expansion of the heat storage medium is possible in the case of a phase transition from solid to liquid. In this case the electrical heating means is spaced apart so far from the upper edge that it is also surrounded by the heat storage medium when this is in the solid state.

Through the arrangement in the upper region, a liquefaction of the heat storage medium within the housing takes place from the top downwards. Problematic material stresses and loads can thereby be avoided.

It can be provided that the electrical heating means is immersed directly into the heat storage medium. A good heat transfer can thereby be achieved.

Due to high temperatures, the lifespan of the electrical heating means is comparatively short. In order to be able to exchange it quickly, one or more entry openings for the electrical heating means can be provided on the housing. Electrical lines of the electrical heating means, through which the electrical heating means is supplied with electrical energy, can also extend through the entry openings.

The housing can also have one or more receiving pipes for the electrical heating means. The receiving pipe(s) is/are arranged so that they project into the housing and are surrounded there by the heat storage medium. The receiving pipes are accessible from an environment of the housing in order that the electrical heating means can be introduced into the receiving pipes. The receiving pipes can each be adjacent to an entry opening and be accessible from externally. Through the receiving pipes a protection is achieved between the heat storage medium and the electrical heating means. In addition it is easier to exchange the electrical heating means, as it is not in direct contact with the heat storage medium. In order nonetheless to achieve a good heat transfer the electrical heating means can directly contact the receiving pipes. It can also be provided to introduce a liquid/a fluid into the receiving pipes for heat transfer.

In order to ensure heating as evenly as possible as well as the greatest heat output possible, the electrical heating means preferably comprises a plurality of heating elements. These can be movable independently of each other. Each heating element can be introduced through an entry opening and/or into a receiving pipe.

In contrast with the electrical heating means, the heat exchanger is preferably arranged outside of the housing. It is thereby ensured that in the event of a leak of the heat exchanger, no heat carrier fluid can enter the housing. This could otherwise result in an explosion of the housing or other damage. This risk is minimised by the heat carrier fluid being separated from the heat storage medium at least by the housing and by a wall of the heat exchanger.

While the electrical heating means can be arranged in the upper region of the housing, it can be preferable to arrange the heat exchanger on a lower side of the housing. Cooling of the heat storage medium is thus achieved in the lower region of the housing. Solidification of the heat storage medium thereby begins on the lower inner side of the housing. Stresses of the heat storage medium are thereby avoided that would arise if it were partially solid and partially liquid.

The heat exchanger preferably has a plurality of heat exchange lines which are arranged one beside the other and spaced apart from each other below the housing. The heat exchanger lines preferably cover a greatest possible proportion of the lower side, for example at least 50% or at least 80%. A particularly good heat transfer is thereby possible. The surface area portion can be defined by a heat exchanger surface area which is covered by the outermost heat exchanger lines and converted into a ratio to the surface area of the lower side of the housing.

The heat exchanger can comprise an inlet collecting line and an outlet collecting line, each of the heat exchanger lines extending from the inlet collecting line to the outlet collecting line.

The heat exchanger can be directly adjacent to the housing on its lower side. A good heat conduction is thereby achieved. Alternatively, a heat conducting body can be adjacent to the lower side of the housing. The heat exchanger contacts the heat conducting body directly here and can extend in particular (at least partially) within the heat conducting body. The heat conducting body usefully has a higher melting point than the heat storage medium and can be made for example of copper.

A connection between the heat exchanger and the heat conducting body can be produced by the heat conducting body being formed in a melted state around the heat exchanger. A connection between the heat conducting body and the lower side of the housing can be produced by the heat conducting body being pressed in the still melted state against the lower side of the housing. A mechanically stable hold and a good heat transfer are hereby achieved.

Heat exchanger lines of the heat exchanger can extend in an ascending manner below the housing, i.e. ascending in the flow direction. If the heat carrier fluid undergoes a phase transition from liquid to gas, the density decreases, whereby it is forced upwards and thereby into the flow direction. In spite of this ascent, a thermal contact with the heat storage medium is nonetheless to be produced over the whole surface area of the heat exchanger. For this, a housing lower side of the heat exchanger can extend in an inclined manner, corresponding to the gradient. If a heat conducting body is provided, this can also guarantee a heat transfer when a distance of the heat exchanger to the lower side of the housing is variable over the lower side of the housing.

Instead of the arrangement of the heat exchanger lines, as described above, below the housing, it is also possible to arrange the heat exchanger lines of the heat exchanger laterally against the housing. A suitable flow of the heat carrier fluid through the heat exchanger can hereby be made easier in comparison with the arrangement below the housing. If two heat accumulators are used one beside the other, each having a housing and an electrical heating means, in the case of a lateral arrangement a single heat exchanger can advantageously be used for both heat accumulators. The term "lateral(ly)" is intended to mean here on a side of the housing which is not the top side or bottom side.

A heat insulation container can be provided which surrounds the housing, the heat conducting body and the heat exchanger. All particularly hot components are hereby advantageously surrounded, whereby a heat loss from them can be extensively avoided.

A gas expansion line can be provided at an upper region of the housing which fluidically connects an inner space of the housing to an environment in order to bring about a pressure compensation. The environment of the housing can describe an inner space of a possibly provided heat insulation container which surrounds the housing, or a non-closed space. It can be preferable that the gas expansion line leads to a closed container, whereby the loss of gaseous portions of the heat storage medium is avoided. According to a simple design the gas expansion line is a hole in the housing. Through the hole a pipe can extend which can lead in particular to a closed container.

The housing can comprise a cover on its top side. This can be opened in order to introduce heat storage medium into the housing or to remove it therefrom. The gas expansion line can extend through the cover or in any case above the electrical heating means.

The housing can furthermore also comprise one or more connection openings for temperature sensor(s) to be introduced.

The electrical heating means can be supplied with electrical energy via electrical supply lines. These supply lines can heat up greatly during operation. Ideally, heat should be removed from the supply lines and meaningfully used. For this, heat removal means can be provided which facilitate a heat removal from electrical supply lines of the electrical heating means to (feed) lines of the heat exchanger. Heat energy is thus advantageously also used by the electrical supply lines to heat the heat carrier fluid. The heat removal means can surround the electrical supply lines outside of the housing in order to absorb heat therefrom. In addition they can be connected to (feed) lines of the heat exchanger in order to channel heat away to the heat carrier fluid in the feed lines. For example the heat removal means can be formed by a metal block.

The invention also comprises a heat storage device with a plurality of heat accumulators according to the invention. The heat accumulators can be formed as described in the present disclosure. The heat accumulators of the heat storage device can be designed identically or differently from each other.

The heat accumulators each have a housing and an electrical heating means. Either one heat exchanger per heat accumulator can be provided or adjacent accumulators share a heat exchanger. This can be realised easily in particular with a lateral arrangement of the heat exchanger. The total number of heat exchangers can hereby be lower than the number of heat accumulators. It can be lower by 1 or, in the extreme case with a paired arrangement of numerous heat accumulators, be half the number of heat accumulators. Alternatively, the number of heat exchangers can also be higher than the number of heat accumulators. For example each of the heat accumulators can have a respective heat exchanger on two opposing sides, whereby adjacent heat accumulators share a heat exchanger lying between them. The total number of heat exchangers can hereby be 1 greater than the number of heat accumulators.

The heat exchangers of the plurality of heat accumulators are preferably hydraulically connected to each other, i.e. lines for the heat carrier fluid of the different heat exchangers are fluidically connected to each other. It can be advantageous if a plurality of heat accumulators and thus their heat exchangers are arranged in series. The heat carrier fluid is hereby conveyed from one heat exchanger to another. Alternatively or additionally, at least some of the heat accumulators and thus some of the heat exchangers can be arranged in parallel. The heat carrier fluid can thereby be distributed by a shared inlet line onto several paths which lead to heat exchangers of different heat accumulators and subsequently together lead to a shared outlet line.

It can be advantageous if a shared insulation housing/heat insulation container is present, in which the plurality of heat accumulators are received. Heat energy losses can thereby be reduced.

The plurality of heat accumulators of the heat storage device can have a shared electrical supply line, via which the respective electrical heating means are supplied with electrical energy.

The plurality of heat accumulators can be arranged in a row, in a plurality of rows or in a plurality of rows lying one above the other. The heat accumulators can thereby be orientated so that their receiving pipes for the electrical heating means are accessible from the same side. This side can also be described as the front side. For easier accessibility, the front side is perpendicular to side walls of the heat exchangers which face each other in a series arrangement. Hydraulic connections of the heat exchangers can on the other hand be located on the side walls of the housing, thus on the walls, facing each other, of two adjacent heat exchangers of the same row. A simple hydraulic connection of adjacent heat exchangers thereby becomes possible and unnecessarily long paths can be avoided.

Electronic control means can be provided and configured to feed a certain electrical power to each electrical heating means. Electrical energy can thus be received from an external power network to a variable extent. In addition the different electrical heating means can be supplied with different energy outputs. In the case of a smaller amount of energy being received from an external power network, a target temperature of the heat storage medium can be achieved at least for some of the heat accumulators.

Electronic control means can also be provided and configured to control a passage of heat carrier fluid through the different heat exchangers individually for each heat exchanger. This can be realised in particular in dependence upon the respective temperature of the heat storage medium of the different heat accumulators.

In addition the invention relates to a system with at least one heat accumulator according to the invention or a heat storage device according to the invention. The system additionally comprises an installation which is arranged to receive heat energy from the heat carrier fluid. The installation comprises one or more of the following: a steam turbine to generate kinetic energy from the heat energy received, a power generation device to generate electrical energy from the heat energy received, a device for gasification processes with heat supply (for example the conversion of solid coal into a carbon-containing gas), a heating system for heating buildings or one or more thermal power stations. These installations exploit the fact that the heat accumulator according to the invention can output a heat carrier fluid with comparatively high temperature. These high temperatures are required for example with steam turbines, in most common processes to generate electrical power or in gasification processes. A further advantage is that these installations can use relatively large amounts of energy, meaning that the large storage capacity of the heat accumulator according to the invention can be fully exploited.

Variants of the method according to the invention follow from specified use of the components described here.

Further advantages and features of the invention will be described below by reference to the attached schematic figures, in which:

FIG. 1 shows a perspective view of a first embodiment of a heat accumulator according to the invention;

FIG. 2 shows a sectional view of the heat accumulator of FIG. 1, wherein the heat storage medium is in the solid state;

FIG. 3 shows a sectional view of the heat accumulator of FIG. 1, wherein the heat storage medium is in the liquid state;

FIG. 4 shows a perspective view of the heat accumulator of FIG. 1, wherein the components thereof are shown transparently for illustration purposes;

FIG. 5 shows, in a perspective view, a section through the heat accumulator of FIG. 1;

FIG. 7 shows a perspective view of a cut-out of the heat accumulator of FIG. 1;

FIG. 8 shows an example embodiment of a heat storage device according to the invention;

FIG. 9 shows a sectional view of a further example heat storage device according to the invention;

FIG. 10 shows a sectional view of a further example heat accumulator according to the invention; and FIG. 11 shows a sectional view of an, in turn, further example heat storage device according to the invention.

The same components and those acting in the same way are provided with the same reference numerals in all the drawings.

Figure 6:
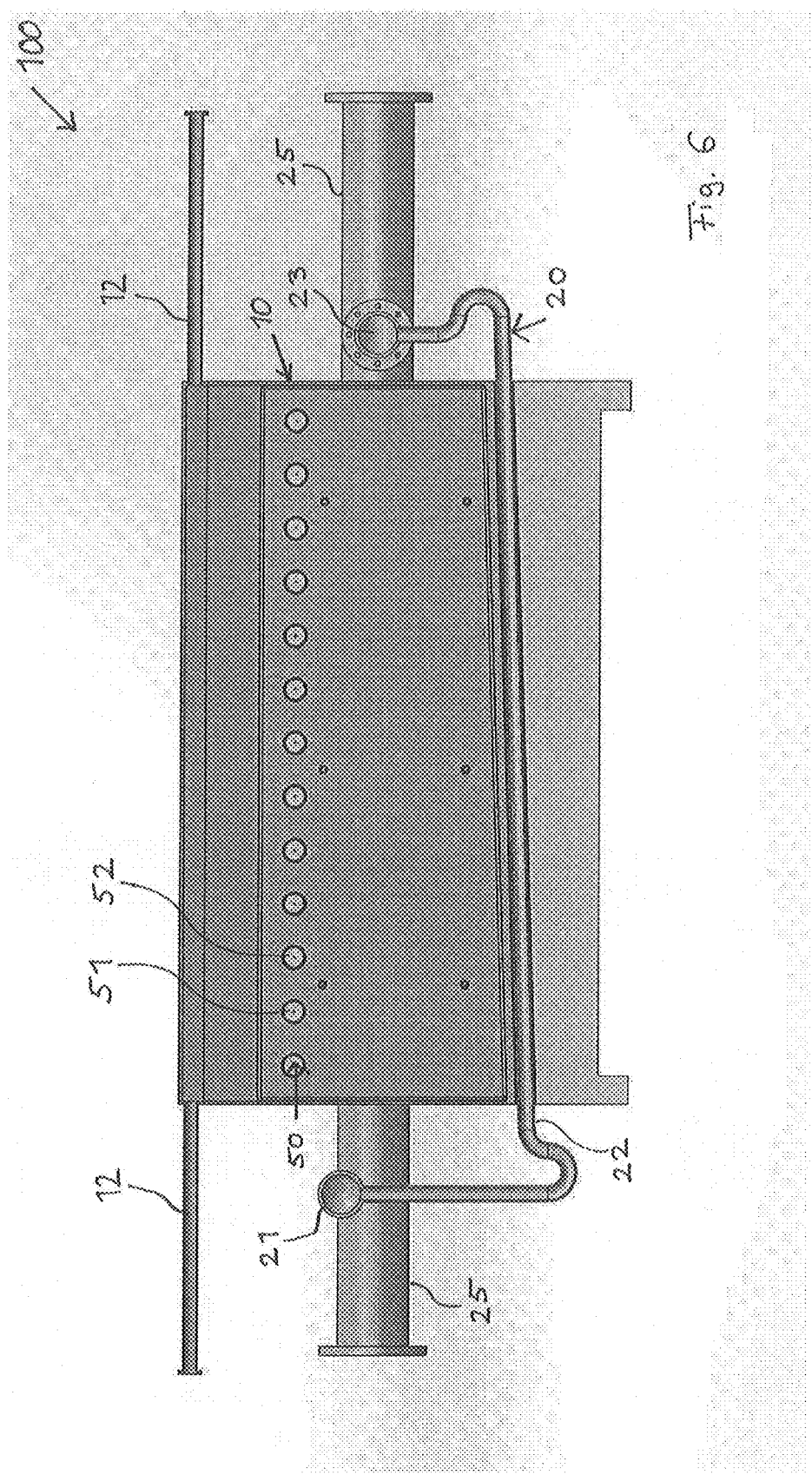
FIG. 6 shows a side view of the heat accumulator of FIG. 1.

A first embodiment of a heat accumulator 100 according to the invention is shown schematically in FIGS. 1 to 7. The heat accumulator 100 comprises as essential components: a housing 10, in which a heat storage medium 15 is received, a heat exchanger 20 and an electrical heating means 50.

The electrical heating means 50 is designed to receive electrical energy and to convert it into heat energy. For this, it can for example have resistors, through which a current is conveyed during operation.

The heat energy produced is emitted to the heat storage medium 15 (FIGS. 2 and 3). The heat storage medium 15 is a metal, preferably aluminium.

Heat energy can be transferred via the heat exchanger 20 from the heat storage medium 15 to a heat carrier fluid which flows or is pumped through the heat exchanger 20.

Electrical energy in the form of heat energy can be stored by the heat accumulator 100. Advantageously, electrical energy can be received when a surplus is available, for example when the power price falls below a predefinable threshold. The energy received can be stored for a long time by the heat storage medium. Losses are thereby very small. By using a metal, in particular aluminium, as a heat storage medium, the heat carrier fluid can be heated to comparatively high temperatures, for example to over 300° C. or 500° C.

It can thereby be used for numerous applications, in particular also to generate electrical energy. A buffer can be provided for fluctuations in the amount of electrical energy available. In particular, by means of the heat accumulator and a connected installation for generating electrical energy from heat energy of the heat accumulator, a net electrical energy can be received when the power price is below a predefinable threshold value.

If on the other hand the power price increases above a predefinable threshold value, net electrical energy can be output.

The electrical heating means 50 can have a plurality of heating elements 51, 52. These project into the housing 10 so that they are surrounded by the heat storage medium 15 (see for example FIGS. 2 and 3.).

The heating means 50 is preferably designed to heat the heat storage medium 15 above its melting point. Additional energy can be stored through this phase transition.

The housing 10 is not completely filled with the heat storage medium 15. It is thereby taken into consideration that the heat storage medium 15 expands upon transition from the solid to the liquid state.

The heating means 50 is arranged at a height, at which it is just still surrounded by the heat storage medium 15 when this is in the solid state. A fill level of the housing 10 with solid heat storage medium is shown in FIG. 2, while FIG. 3 shows the case with a liquid heat storage medium.

By arranging the heating means 50 as high up as possible in the housing 10, a phase transition begins from solid to liquid in the upper region. Material stresses of the heat storage medium 15 are thereby avoided.

The heating elements 51, 52 run through the housing preferably completely or extend at least over 80% of a housing breadth. This causes an even heating. For this purpose, a plurality of heating elements 51, 52, for example at least ten heating elements, are preferably also provided, which are distributed over a length of the housing 10.

Each of the heating elements 51, 52 is introduced into the housing 10 through a respective opening in the housing 10. The heating elements 51, 52 can thereby directly contact the heat storage medium 15. However, they can also be received in receiving pipes which extend within the housing 10, in particular from an opening in the housing 10. The receiving pipes can have a closed end face inside the housing 10 or can alternatively extend as far as an opposite opening in the housing 10. Through the receiving pipes a direct contact of the heating elements 51, 52 with the heat storage medium 15 can be avoided. This can be advantageous as the heating elements 51, 52 are consumable parts which are to be regularly exchanged.

An upper portion in the housing 10 can be filled with gas. In dependence upon the ratio of solid heat storage medium 15 to liquid heat storage medium, the volume for gas varies. In order to reduce pressure differences resulting from such a volume change and/or also from a temperature change of the gas, preferably at least one gas expansion line 12 is provided, see for example FIGS. 1 to 3. The heat accumulator 100 shown comprises two gas expansion lines 12 which connect an inner space of the heat accumulator 100 in an upper region of the heat accumulator 100 to its environment. Gas can thus escape from the housing 10 when the heat storage medium is heated.

The gas expansion lines 12 can extend through a cover 11 of the housing 10, as shown in FIG. 1. The housing 10 can comprise a base body and a cover 11, which closes the base body at the top.

The heat exchanger 20 comprises a plurality of heat exchanger lines 22. These do not extend through the housing 10, but instead on the outside of the housing 10. It is thus ensured that, in the case of an escape of heat carrier fluid from the heat exchanger lines 22, great damage does not occur.

In the example shown, the heat exchanger lines 22 extend below the housing 10. The heat exchanger 20 thereby brings about a cooling of the heat storage medium 15 from below. Freezing of the heat storage medium 15 thus arises from the bottom upwards, whereby material stresses caused by heat convection are avoided.

Alternatively or additionally, the heat exchanger lines can also be arranged on the sides of the housing 10 (not shown).

For good heat conductive contact the heat exchanger lines 22 can directly contact the lower side of the housing 10 (not shown). Alternatively, a heat conducting body 40 can be provided which directly contacts the lower side of the housing 10 and through which the heat exchanger lines 22 extend. Through the heat conducting body 40, heat energy can be transferred from all sides to the heat exchanger lines 22. The heat conducting body 40 can extend over the whole lower side of the housing 10. It can have a height that corresponds to two to four times the diameter of the heat exchanger lines 22. The heat conducting body 40 can be made of metal or include metal which has a higher melting point than the heat storage medium.

A simple production process with good thermal contact and high mechanical stability is facilitated if the melting point of the heat conducting body 40 is below that of the housing 10. In particular in this case the heat conducting body 40 can be heated and (at least in part) melted and then pressed against the lower side of the housing 10. Upon solidification, there is a stable connection to the housing lower side. Similarly, a connection to the heat exchanger lines 22 can be produced.

The heat exchanger lines 22 preferably do not extend horizontally but instead upwards in the flow direction of the heat carrier fluid (see FIG. 6). Advantageous flow properties are hereby brought about. The housing lower side can have a corresponding inclination.

The plurality of heat exchanger lines 22 are connected to an inlet collecting line 21, from which heat carrier fluid flows into the heat exchanger lines 22.

At their opposite end the heat exchanger lines 22 are connected to a shared outlet collecting line 23. The inlet collecting line 21 and the outlet collecting line 23 can be positioned higher than the heat exchanger lines 22.

The inlet collecting line 21 and the outlet collecting line 23 can in turn be connected to at least one feed line 25 for heat carrier fluid. In the embodiment shown, two feed lines 25 are provided which extend parallel to a front side and a rear side of the housing 10 (see for example FIG. 1). The inlet collecting line 21 extends transversely, preferably perpendicularly, to the two feed lines 25 and connects them. In the same way, the outlet collecting line 23 extends transversely, preferably perpendicularly, to the two feed lines 25. The inlet and outlet collecting line 21, 23 can thus extend parallel to two side walls of the housing 10 which are perpendicular to the front and rear side of the housing 10.

Heat carrier fluid thus flows from the feed lines 25 into the inlet collecting line 21, from there into the heat exchanger lines 22, from these into the outlet collecting line and from there finally back into the feed lines 25.

The feed lines 25 can have a larger cross-section than the inlet collecting line 21 and the outlet collecting line 23. This is advantageous if only a proportion of the heat carrier fluid is to be conveyed by the feed lines 25 into the inlet collecting line 21. The remaining portion can be conveyed to further heat accumulators 100, which will be described in more detail below.

The electrical heating means 50 can have electrical supply lines which extend outside of the housing 10 and bring about a power supply for each of the heating elements 51, 52. These supply lines heat up during operation. As shown in FIG. 7, heat removal means 55 can be provided which mechanically connect the supply lines of the heating means 50 to the feed line 25. A heat removal into the heat carrier fluid in the feed line 25 is thereby achieved. The heat removal means 55 can consist of a metal which surrounds the electrical supply lines, in particular all supply lines, of the heating means and contacts the feed line 25 on at least one side. Alternatively, the heat removal means 55 can also contact any other fluid line, through which the heat carrier fluid flows.

In FIG. 7, a plurality of temperature sensors 80 are additionally shown which project into the housing 10. As the temperature sensors 80 are arranged at different heights, the temperature of the heat storage medium 15 can be detected at different heights. The temperature sensors 80 can be inserted into longitudinal insert pipes which are connected to the housing. Alternatively, the temperature sensors 80 can directly contact the heat storage medium. In order that the temperature is detected at a certain height, the longitudinal insert lines or the longitudinal temperature sensors 80 preferably extend horizontally, as shown in FIG. 7. Through the temperature measurements at different heights, electronic control and evaluation means can deduce the proportions in which the heat storage medium 15 is solid or liquid. In dependence upon the temperature measurement values, the amount of electrical energy received by the electrical heating means 50 can be controlled.

FIG. 8 shows a heat storage device 110 according to the invention which comprises a plurality of heat accumulators 100 according to the invention. Four of these heat accumulators 100 are shown. The heat accumulators 100 are arranged in rows, wherein a plurality of rows can be arranged one on top of the other.

Heat exchangers 20 of different heat accumulators 100 of the same row can be fluidically, i.e. hydraulically, connected to each other. An example embodiment is shown, wherein the feed lines 25 of heat exchangers 20 of different heat accumulators 100 are interconnected. The heat accumulators 100 are arranged so that interconnected feed lines 25 of different heat accumulators 100 have a linear progression. This is advantageous with respect to flow properties. Control means can adjust, in dependence upon the temperature of the respective heat accumulator 100, whether heat carrier fluid is to be pumped through its heat exchanger lines 22.

The electrical heating means 50 of the different heat accumulators 100 are arranged on end faces of the respective heat accumulators 100. The end faces point away from the direction of a row, in which the heat accumulators 100 are arranged, i.e. a surface normal of the end faces is perpendicular to the direction of a row. The heating means 50 are thereby easily accessible. Such access is regularly required in order to exchange the heating means 50. Control means preferably set, for each of the heating means 50 individually, the amount of electrical energy to be fed to it. For example the heating means 50 of some heat accumulators 100 can only be activated once a desired temperature has been reached in other heat accumulators 100.

The gas expansion lines 12 of different heat accumulators 100 can be connected to each other. The heat energy of gas which is to be emitted from a heat accumulator 100 can thus be meaningfully used by bringing heat energy into an adjacent heat accumulator 100. Alternatively, however, the gas expansion lines 12 of different heat accumulators 100 can also not be interconnected, whereby pressure compensation is easier.

A possible hydraulic connection of the heat exchanger 20 of a plurality of heat accumulators 100 is shown in FIG. 9. A heat carrier fluid is initially conveyed via a feed line 25 into the heat storage lines 22 of a plurality of heat exchangers 20. From there, the heat carrier fluid flows in the heated state further into a line 26. This can convey the heat carrier fluid to another installation, where the heat energy thereof can be used for example for gasification processes.

A further example embodiment of a heat accumulator 100 according to the invention is shown in FIG. 10 in a sectional view. This differs from the heat accumulator of for example FIG. 2 through the design of the heat exchanger 20. According to FIG. 10, the heat exchanger 20 is not arranged below the housing 10. Instead, at least one heat exchanger 20 (in the example shown: two heat exchangers 20) is/are arranged on side surfaces of the housing. There is a respective heat conducting body 40 on each of these side surfaces to transfer heat from the housing 10 to the heat exchangers 20. Heat exchanger lines of the heat exchangers 20 do not extend horizontally on these sides, but instead inclined or vertically. A suitable upward flow of the heat carrier fluid in the heat exchanger lines can thereby be easily achieved.

A plurality of the heat accumulator 100 shown in FIG. 10 can also be connected to form a heat storage device 110. This is shown schematically in FIG. 11. Through the lateral arrangement of the heat exchangers 20 and the optionally provided heat conducting bodies 40, two adjacent heat accumulators 100 can share a heat exchanger 20 lying between them and the associated heat conducting body 40.

In the case of a lateral arrangement the heat exchanger 20 and the optionally provided heat conducting body 40 can end below an upper end of the housing 10 (see figures). The heat exchanger 20 and the heat conducting body 40 can be arranged with their centre of gravity below a centre of the heat accumulator 10. It can thereby be ensured that solidification of the heat storage medium begins in the lower region of the housing 10.

In FIG. 11 the heat storage medium 15 is present in liquid form, while it is solid in the case of FIG. 10. In the liquid state the fill level in the housing 10 is higher and is closer to the gas expansion line 12 than to the electrical heating means 50, while this is reversed in the solid state.

An undesired loss of heat from a heat accumulator 100 is to be avoided as far as possible. For this, a heat insulation container 90 can be provided (FIGS. 2 and 9 to 11). The heat insulation container 90 preferably surrounds at least the housing 10 with the heating means 50 arranged therein and the heat exchanger 20. If a plurality of heat accumulators 100 are provided one beside the other (FIGS. 9 and 11) a single heat insulation container 90 can surround the components 10, 20, 50 of a plurality of heat accumulators 100.

The arrangement of a plurality of heat accumulators 100 facilitates on the one hand an increase in the maximum storable energy. On the other hand, in contrast with a single particularly large heat accumulator 100, it can be ensured that, even in case of fluctuations in the stored heat energy, a desired temperature is reached at least in some of the heat accumulators 100, through which the heat carrier fluid is to be heated. Furthermore a subsequent expansion by one or more heat accumulators 100 can be easily carried out through a heat storage device 110 with a plurality of heat accumulators 100.

The heat accumulator 100 according to the invention offers significant advantages in that large amounts of electrical energy can be stored in the form of heat energy, with which, due to the metal, in particular aluminium, which is used as a heat storage medium, a heat carrier fluid can be heated to very high temperatures in comparative terms.

The invention claimed is:

1. A heat accumulator comprising
a housing to receive a heat storage medium,
a heat storage medium received in the housing and
a heat exchanger, in which a heat carrier fluid can be transported and which is arranged so that heat can be transferred from the heat storage medium to the heat carrier fluid,
wherein
an electrical heater is provided which is configured to convert electrical energy into heat energy,
the electrical heater is arranged so that it heats the heat storage medium during operation,
the heat storage medium heated by the electrical heater is a metal, and
a gas expansion line is provided at an upper region of the housing which fluidically connects an inner space of the housing to an environment in order to bring about a pressure compensation.

2. The heat accumulator as defined in claim 1,
wherein
the heat storage medium is aluminium.

3. The heat accumulator as defined in claim 1,
wherein
the electrical heater is configured to heat the heat storage medium to above its melting point.

4. The heat accumulator as defined in claim 1,
wherein
the electrical heater is arranged so that it emits heat energy in an upper region within the housing to the heat storage medium.

5. The heat accumulator as defined in claim 1, wherein
the housing has receiving pipes for the electrical heater, wherein the receiving pipes are arranged so that they project into the housing and are surrounded there by the heat storage medium, and the receiving pipes are accessible from an environment of the housing to introduce the electrical heater into the receiving pipes.

6. The heat accumulator as defined in claim 1, wherein
the heat exchanger is arranged outside of the housing.

7. The heat accumulator as defined in claim 1, wherein
the heat exchanger is arranged on a lower side of the housing.

8. The heat accumulator as defined in claim 7, wherein
a heat conducting body is adjacent to the lower side of the housing and the heat exchanger extends in the heat conducting body.

9. The heat accumulator as defined in claim 8, wherein
a connection between the heat exchanger and the heat conducting body is produced by the heat conducting body being formed in a melted state around the heat exchanger, and
a connection between the heat conducting body and the lower side of the housing is produced by the heat conducting body being pressed in the still melted state against the lower side of the housing.

10. The heat accumulator as defined in claim 1, wherein
heat exchanger lines of the heat exchanger extend in an ascending manner below the housing.

11. The heat accumulator as defined in claim 1, wherein
heat exchanger lines of the heat exchanger are arranged laterally on the housing.

12. The heat accumulator as defined in claim 1, wherein
heat removal means are provided which facilitate a heat removal from electrical supply lines of the electrical heater to feed lines of the heat exchanger.

13. A heat storage device having
a plurality of heat accumulators which are each formed as defined in claim 1,
wherein the heat exchangers of the plurality of heat accumulators are hydraulically connected to each other.

14. The heat storage device as defined in claim 13, wherein
the plurality of heat accumulators are arranged in a row or in a plurality of rows lying one above the other, and
the heat accumulators are orientated so that their receiving pipes for the electrical heater are accessible from the same side.

15. A system comprising
at least one heat accumulator as defined in claim 1 or a heat storage device as defined in claim 13 and
an installation which is arranged to receive heat energy from the heat carrier fluid, wherein the installation comprises one or more of the following: a steam turbine to generate kinetic energy from the heat energy received, a power generation device to generate electrical energy from the heat energy received, a device for gasification processes with the supply of heat, a heating system for heating buildings.

16. A method for operating a heat accumulator, the method comprising:
transferring heat energy from a heat source to a heat storage medium which is received in a housing of the heat accumulator, and
transferring heat energy from the heat accumulator to a heat carrier fluid which is transported through a heat exchanger,
wherein
as a heat source an electrical heater converts electrical energy into heat energy,
the heat energy generated by the electrical heater is transferred to a metal as a heat storage medium, and
a gas expansion line is provided at an upper region of the housing which fluidically connects an inner space of the housing to an environment in order to bring about a pressure compensation.

* * * * *